(12) United States Patent
Qvarth

(10) Patent No.: US 6,272,726 B1
(45) Date of Patent: Aug. 14, 2001

(54) METHOD FOR THE MANUFACTURE OF METAL COMPONENTS REQUIRING CHIP REMOVING MACHINING

(75) Inventor: Ingemar Qvarth, Valbo (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/500,993

(22) Filed: Feb. 9, 2000

(30) Foreign Application Priority Data

Feb. 10, 1999 (SE) .................................................. 9900440

(51) Int. Cl.$^7$ ..................................................... B23P 17/00
(52) U.S. Cl. ................. 29/412; 29/417; 29/559; 279/138; 82/1.11; 83/485
(58) Field of Search ............................... 29/412, 417, 423, 29/557, 558, 559; 279/2.01, 138, 141; 269/48.1; 82/1.11, 46, 47, 117; 409/231, 232; 407/35, 43; 83/485, 733, 885

(56) References Cited

U.S. PATENT DOCUMENTS

| | | | |
|---|---|---|---|
| 2,734,749 | * | 2/1956 | Benjamin . |
| 3,073,610 | * | 1/1963 | Mackinder . |
| 4,252,102 | * | 2/1981 | Phaal et al. ............................. 125/39 |
| 4,901,546 | * | 2/1990 | Uyeda et al. .......................... 70/323 |

\* cited by examiner

Primary Examiner—P. W. Echols
Assistant Examiner—John C. Hong
(74) Attorney, Agent, or Firm—Burns, Doane, Swecker & Mathis, L.L.P.

(57) ABSTRACT

Identical ring-shaped metal blanks are machined whereby each blank forms a plurality of identical components. The blanks are first machined on both sides, and then a stack of the blanks is clamped axially adjacent one another on an arbor. Tools machine the blanks for reshaping the blanks. One of the tools is a slitter which makes axial cuts through the stack to separate each blank into a plurality of components distributed around the axis.

10 Claims, 3 Drawing Sheets

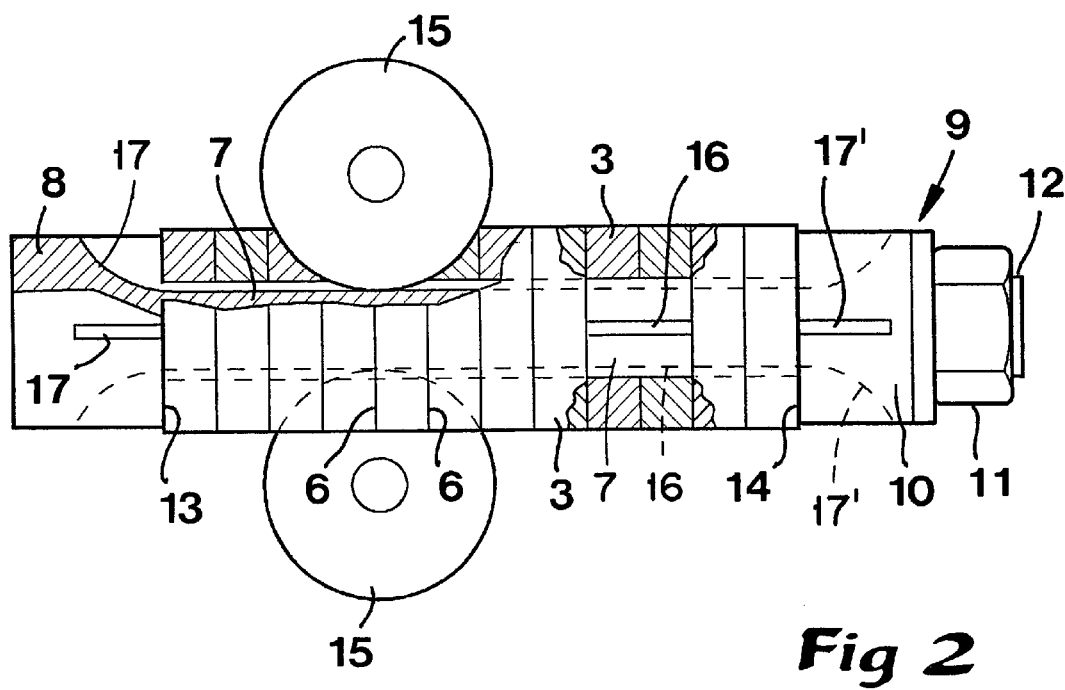
Fig 2
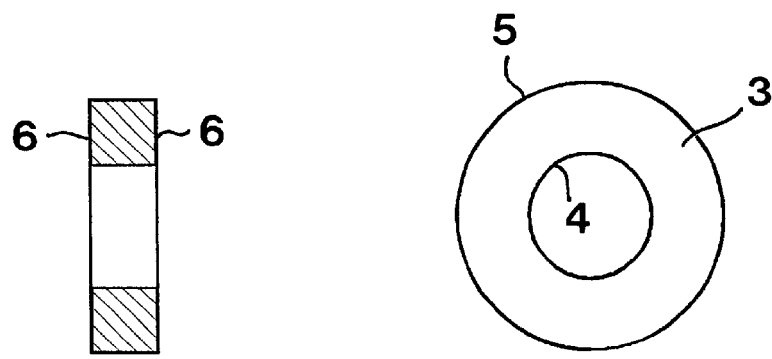
Fig 4          Fig 3

METHOD FOR THE MANUFACTURE OF METAL COMPONENTS REQUIRING CHIP REMOVING MACHINING

BACKGROUND OF THE INVENTION

The invention pertains to methods and apparatus for the manufacture of metal components requiring chip removal machining.

Tools for chip removing machining, such as milling tools, drilling tools, turning tools and the like commonly include miscellaneous components which are of a limited size in relation to the tool in its entirety and which must be machined to high accuracy. Examples of such components are cassettes and wedges for milling tools, shims for drilling and turning tools, clamps and chip breakers for milling tools, etc. Critical surfaces on such components often require tolerances within the range of 0.005–0.02 mm. The same fine tolerances are also required for holes in the components and for serrations, thereon. Such components are usually made of steel, which requires hardening.

Manufacturing methods, known hitherto, require individual handling of metal blanks, which are slightly larger than the components will be after all machining has been completed. Usually, the blanks are cast in steel, and then the individual blanks are machined in a series of different operations. In the case of, for instance, cassettes for milling tools, seats are milled for cutting inserts at a certain machining station, while grinding of external surfaces takes place at another station. At additional stations, serrations may be produced by the milling of an external surface, and holes may be drilled and possibly screw-threaded.

Between these stations, the individual blanks have to be handled separately since they have to be released from the fixture in question after a first machining operation and then re-mounted in another fixture for the next machining operation. In case one and the same blank is to be submitted to many machining operations, the handling as a whole will be time-consuming and expensive. Furthermore, the individual handling at and between different machining stations has the aggravating disadvantage that the dimensional accuracy may suffer. Thus, if all blanks are not positioned and fixed in the same way, there is a risk that individual components get unacceptable tolerance deviations. It should also be mentioned that the requisite hardening of the blanks/components has to be carried out individually.

Objects and Features of the Invention

The present invention aims at obviating the above-mentioned disadvantages of the previously applied manufacturing method and, in a first aspect, at providing an improved method for the manufacture of components which require chip removing machining. A primary object of the invention is to provide a manufacturing method which permits an accurate machining of the requisite metal blanks without the need to move, between different machining stations and fixtures, respectively, a plurality of components which in all essentials could instead be machined to completion at one machining station. An object is also to provide a manufacturing method, which permits an efficient and thereby inexpensive production.

According to the invention, at least the primary object is obtained by a method of manufacturing metal components, comprising the step of:

A) face-machining opposite sides of each of a plurality of ring-shaped metal blanks;

B) securing the face-machined blanks in axially adjacent relationship along an axis, whereby the blanks are immovable relative to one another; and C) performing a plurality of different chip-removing machining operations on each blank for reshaping the blanks, one of the machining operations comprising making axial cuts through the blanks in a direction parallel to the axis to separate each blank into a number of components distributed around the axis.

Another aspect of the invention involves an apparatus for machining metal components. The apparatus includes an arbor which defines an axis. The arbor has a stop surface at one axial end thereof and a clamp at an opposite axial end thereof. A set of ring-shaped metal blanks is clamped on the arbor between the stop surface and the clamp so as to be immovable relative to one another. A plurality of machining tools is provided for performing a plurality of different chip-removing machining operations on each blank for reshaping the blanks. One of the machining tools is arranged for making axial cuts through the blanks in a direction parallel to the axis for separating each blank into a number of components distributed around the axis.

BRIEF DESCRIPTION OF THE DRAWINGS

In the drawings:

FIG. 2 is a partial cross-sectional side view showing a number of ring blanks fixed on the arbor, FIG. 3 is a side view of a single ring blank, FIG. 4 is a cross-section through the ring blank according to FIG. 3.

DETAILED DESCRIPTION OF A PREFERRED

Embodiment of the Invention

Figure 1:
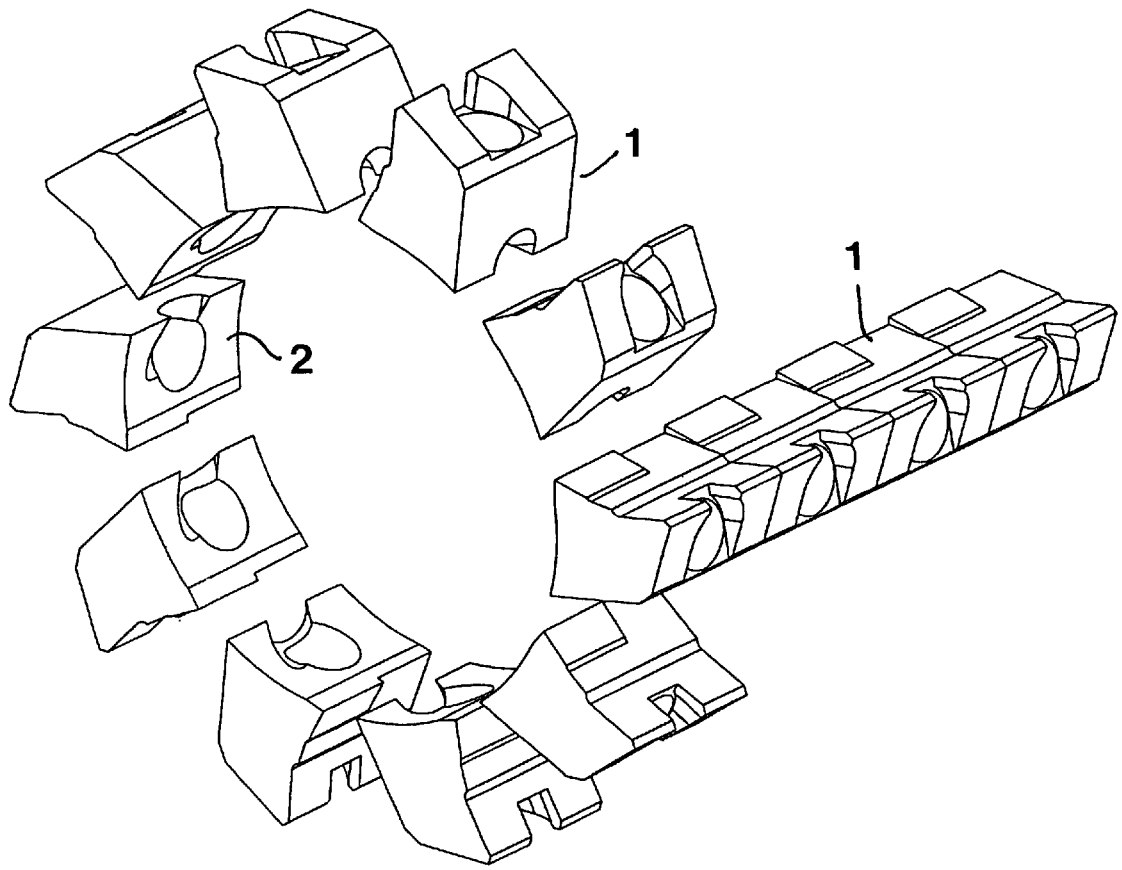
FIG. 1 is a schematic, exploded view showing a number of tangentially spaced, finish-machined components, as well as a number of components arranged axially one after the other.
Figure 1A:
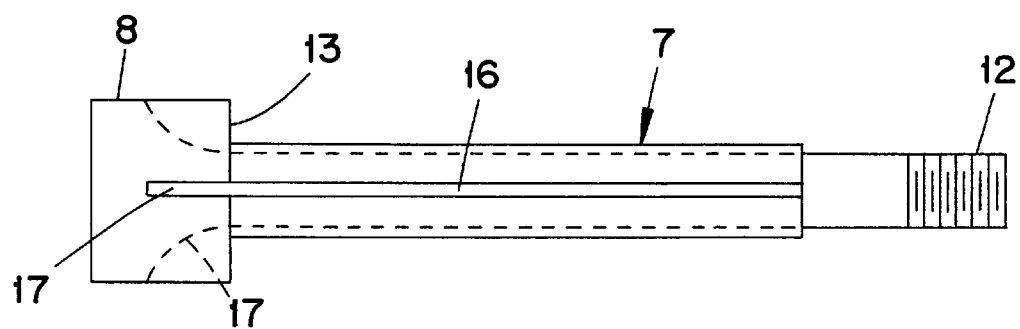
FIG. 1A is a side elevational view of an arbor according to the present invention.

In FIG. 1 a number of metal components 1 are shown, of which some are tangentially spaced and located in a ring-shaped configuration, while others are arranged side by side in an axial extension of one of the components in the ring formation. In the shown example, these components consist of wedges having the purpose of clamping a cutting insert in a cassette included in a milling tool (wherein the wedges would be arranged in the shown ring shape). In addition to a number of planar surfaces, this type of wedge is delimited by a concavely arched surface 2.

Reference is now made to FIGS. 1A–6, which illustrate schematically a method according to the invention for making the wedges, together with a device for carrying out the method.

In FIGS. 3 and 4 a metal blank 3 in the shape of a ring is shown (in a small scale). In this case, the ring is cylinder-shaped in that the same is delimited by a cylindrical inner surface 4 and a likewise cylindrical outer surface 5, the two opposite side surfaces 6 being planar and mutually substantially parallel. Alternatively, the ring and arbor could be non-cylindrically shaped, e.g., polygonally shaped in cross-section.

In FIGS. 1A, 2, 5 and 6, reference numeral 7 designates an arbor which at one end has a stop member 8 and at the opposite end an axially movable clamping mechanism generally designated 9. In the preferred embodiment, this clamping mechanism includes a cage 10 axially movable along the arbor, as well as a nut 11, which is fastened with screws on a threaded end portion 12 of the arbor. In the example, the stop member 8 consists of a thickened portion of the arbor. This thickened portion as well as the cage 10 have planar shoulder surfaces 13 and 14, respectively, which extend perpendicularly to the geometrical, longitudinal axis of the arbor.

Two cutting tools, shown schematically, are in the form of so-called slitting cutters 15. Slits or cuts may be milled in the ring blanks 3 by means of these cutters, which blanks are mounted in axially adjacent relationship on the arbor and fixed thereon by means of the clamping mechanism. A number of circumferentially spaced grooves 16 extending axially along the arbor are provided in order to be able to receive peripheral edges of the cutters whilst they cut completely through the set of rings. Partially circular recesses 17 serving as extensions of the grooves 16 are formed in the portion 8, which serves as a stop member. Analogous recesses 17' are formed in the cage 10.

An important feature of the method according to the invention consists of using, as manufacturing blanks, ring blanks 3 which individually have a volume large enough to form a plurality of finished components 1. In the example according to FIG. 1, each individual ring blank 3 is assumed to be large enough to permit the manufacture of ten components.

In a first manufacturing step, the individual ring blank is face-machined on the two opposite sides 6 thereof. This machining, which, in practice, can consist of face milling or face grinding, can be carried out in a conventional way, to an accuracy within the range of 0.005–0.02 mm. In a second step, two or more face machined ring blanks are put together one after the other along a common geometrical axis, and fixed in relation to each other while forming a stable set of rings. In the example according to FIG. 2, twelve ring blanks are shown in such a set. In practice, the rings are axially inserted onto the arbor 7, and then the cage 10 is applied and tightened by means of the nut 11. Thanks to the fact that all the ring blanks have face-machined, parallel side surfaces 6, and that the pressing surfaces 13, 14 extend perpendicularly to the longitudinal axis of the arbor, an immovable clamping of the rings in the set is achieved.

Figure 5:
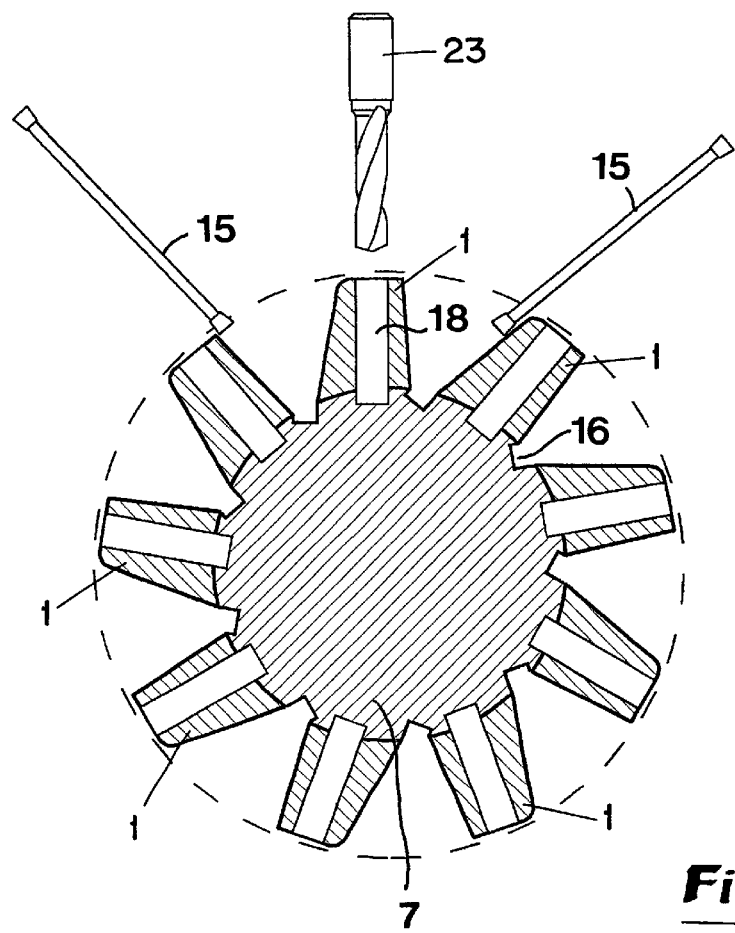
FIG. 5 is an enlarged cross-section through the arbor according to FIG. 2 with a number of components positioned peripherally on the arbor.
Figure 6:
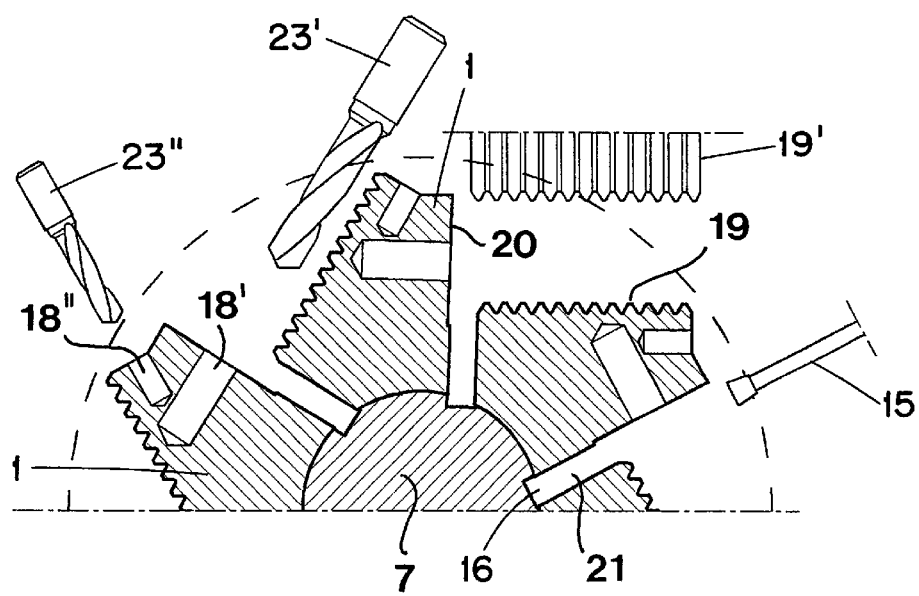
FIG. 6 is an enlarged, partial cross-section through an arbor and a number of other components illustrating other feasible machining operations than those shown in FIG. 5.

When the set of ring blanks have been fixed, the ring set is submitted to a number of chip removing machining operations, the nature of which depends on the type of component which is desired. In FIGS. 5 and 6 examples are given as to how drills 23, 23', 23" may provide a possible means of drilling holes of different types in the ring blanks, e.g. a through-hole 18 for receiving a fastener screw, a hole 18' which forms a spring seat, and a hole 18", respectively, for a pin. Furthermore, serrations 19 may be formed by means of a milling cutter along one side of the component. In other respects, a number of face machined surfaces 20 are formed by means of one or more facemills which with modern milling equipment may be given a very close dimensional accuracy. Although the drilling operations are carried out one-by-one in different positions, all milling operations may be carried out by relative axial movements between the ring set and the milling tool, whereby each surface or serration can be machined in one single pass. In other words, the tool and/or the ring set is/are transported in one single, unbroken motion from one end of the ring set to the opposite one.

In a number of concluding machining operations, the ring set is given tangentially spaced and radially oriented through-cuts, which form individual components 1 from each blank 3. This may be carried out with the above-mentioned slitting cutters 15, which may cut through the rings entirely, in that the peripheral portions of the cutters carrying the cutting inserts may be led down into the grooves 16 and the recesses 17, 17', respectively, in the stop member 8 and the cage 10, respectively. This slit cutting can be carried out by axial displacement of the milling-cutter through the ring set while forming the component-separating slits 21, whereby the individual components, which are separated from each other, still hang together because they are clamped between the cage 10 and the stop member 8. In other words, the finish-machined components will be separated from the arbor 7 only when the nut 11 and the cage 10 have been separated.

In cases where the components are intended to be included in tools for chip removing machining, they are usually manufactured in steel. The invention offers a possibility to carry out the requisite hardening of the steel before the above-mentioned machining operations are started. In other words, the unmachined ring blanks 3 while in the unmachined state may be submitted to hardening. In that manner, the following advantages are won, the machining accuracy is improved, and the comparatively large ring blanks facilitate and hasten the requisite handling in connection with hardening (the numerous, small components which are extracted from each ring blank would require a handling which is more time-consuming).

A significant advantage of the invention is that numerous components may be machined and extracted at the same time without having to be repeatedly moved between different machining stations and fixtures. This, in turn, ensures high accuracy of the components after all machining has been completed. In all essentials, all components become identical.

In the embodiments exemplified, the ring blanks 3 are cylinder-shaped and used for the manufacture of wedges which have concavely arched surfaces 2 of the type shown in FIG. 1. Other components may, however, require differently shaped surfaces, e.g. planar surfaces. In case the ring blank is cylindrical, a final face machining is required when the components have been separated from each other.

Although after-treatment of the individual components may be needed, the majority of machining operations may be carried out while the ring blanks are kept together in a set which has a stable shape. In this connection, it has been pointed out that the ring blanks, as well as the arbor, may be of a shape other than cylindrical. The ring blanks, for instance, as well as the arbor, may be of a polygonal shape in cross-section (e.g. quadrangular, pentagonal and hexagonal, respectively). In such cases, the arbor and the ring blanks, respectively, may be formed and located in such a way in relation to each other that gaps result between the interior of the ring and the outside of the arbor, with the peripheral portion of the slitting cutter being housed in these spaces. In other words, there would be no need for providing grooves in the arbor.

Other Feasible Modifications of the Invention

The invention is not limited to the embodiments illustrated schematically in the drawings. Thus, it is feasible to dispose the ring blanks in a set in which ring-shaped shims between adjacent ring blanks are included. In other words, the ring blanks do not need to be pressed in direct surface contact with each other as is shown in FIG. 2.

Although the ring blanks, in the preferred embodiments, are placed concentrically in relation to a mutual geometrical axis, e.g. on an arbor common for all ring blanks it is also feasible to mount the ring blanks without any requirement regarding concentricity. Although the above invention has been described in connection with components intended to be included in different types of tools for chip removing machining, the same may also apply for other arbitrary, small components irrespective of the material thereof.

What is claimed is:

1. A method of manufacturing metal components, comprising the steps of:
    A) face-machining opposite sides of each of a plurality of ring-shaped metal blanks;
    B) securing the face-machined blanks on an arbor in axially adjacent relationship along an axis defined by the arbor, whereby the blanks are immovable relative to one another; and
    C) performing a plurality of different chip-removing machining operations on each blank for reshaping the blanks while the blanks remain secured on the arbor, one of the machining operations comprising employing a cutter for making axial cuts through the blanks in a direction parallel to the axis to separate each blank into a number of components distributed around the axis, wherein during a cutting operation an edge of the cutter is received in an axial groove formed between an outer periphery of the arbor and inner peripheries of all of the blanks.

2. The method according to claim 1 wherein step B further includes pressing the side surfaces of adjacent blanks into direct contact with one another.

3. The method according to claim 1 wherein the blanks that are face-machined in step A comprise hardened steel blanks.

4. The method according to claim 1 wherein the one machining operation which makes axial cuts comprises a slit cutting operation.

5. The method according to claim 1 wherein the one machining operation which makes axial cuts makes each of such axial cuts through all of the blanks from one end-most blank to another end-most blank.

6. The method according to claim 1 wherein step A comprises face-machining opposite sides of each of a plurality of ring-shaped metal blanks of circular cross-section.

7. The method according to claim 1 wherein step A comprises face-machining opposite sides of each of a plurality of ring-shaped metal blanks of non-circular cross-section.

8. The method according to claim 1 wherein the blanks used in step A are identical, and the components formed in step C are identical.

9. The method according to claim 1 wherein another of the machining operations performed in step C comprises drilling a hole in each blank.

10. The method according to claim 1 wherein during step C the edge of the cutter is received in the groove which is disposed in the outer periphery of the arbor.

* * * * *